April 7, 1959

G. A. MAGNI 2,880,482

AUTOCLAVES

Filed May 14, 1956

INVENTOR
GUSTAV ALBERT MAGNI
BY Irwin S. Thompson
ATTY.

United States Patent Office 2,880,482
Patented Apr. 7, 1959

2,880,482

AUTOCLAVES

Gustav Albert Magni, Lidingo, near Stockholm, Sweden

Application May 14, 1956, Serial No. 584,806

4 Claims. (Cl. 21—95)

The present invention generally relates to the field of autoclaves, and more particularly to autoclaves of the kind in which steam under pressure effects sterilization of surgical instruments and the like.

The primary object of the invention is to provide an improved autoclave of the kind referred to in which the heating period may be considerably reduced as compared to hithertofore practice.

Another object of the invention is to provide a novel autoclave of the kind referred to which is extremely easily handled.

For the objects stated, an autoclave according to the invention is mainly characterized in that there is fitted into the bottom of the autoclave a pipe which communicates with a closed steam generating chamber which, in its turn, communicates through at least one further pipe with the interior of the autoclave at a level therein above the bottom of the autoclave, and there being associated with the first-mentioned pipe a valve arranged to be operated in response to the pressure prevailing in the interior of the autoclave so as to be opened automatically at a predetermined reduced pressure value to admit into said steam generating chamber a suitable quantity of liquid present within the autoclave, so as to vaporize this quantity of liquid in the steam generating chamber, the steam thus formed flowing into the autoclave through the last-mentioned pipe or pipes, and said valve being automatically closed as the pressure in the autoclave attains a predetermined higher value.

The steam generating chamber, being a separate vessel, can be maintained at a very high temperature and thus stores a great amount of heat whereby the water introduced into the chamber will vaporize practically instantaneously and fill the autoclave. In this manner it will be possible, at the expense of a reduced and uniform supply of power, to effect a very rapid heating of the autoclave, namely within a period of approximately one minute, whereas the presently known autoclaves require a heating period of around 10 minutes, as a rule. This is of extremely high importance in, for instance, surgical operations where it is essential that sterilized instruments be made available as quickly as possible.

The invention will now be described, reference being had to the accompanying drawing, in which.

Figure 1:
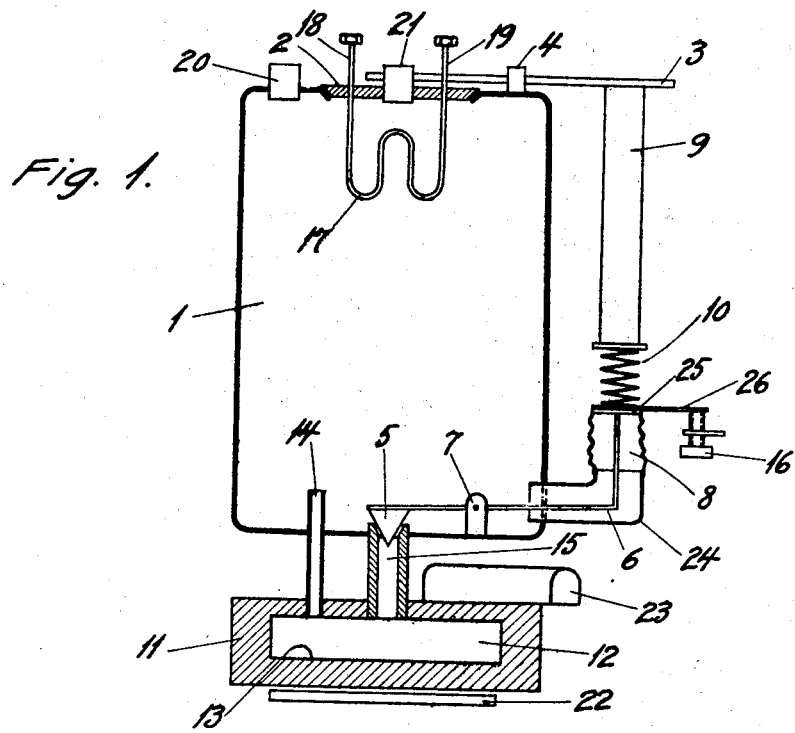
Fig. 1 is a diagrammatic vertical section through an autoclave incorporating the present invention.

Referring now to the drawing more specifically, numeral 1 designates the autoclave proper, or the pressure vessel. The latter is provided in its top wall with an opening which is closed by a removable cover 2. This cover 2 is attached to one end of a lever or handle 3. The cover is secured in its closed position by means of a clamp 4 cooperating with the lever or handle 3.

Fitted centrally inlto the bottom wall of the autoclave is a pipe or tube 15 the open upper end of which is shaped to act as a seat for cooperation with a conical valve member 5. The latter is attached to one end of a lever 6 which is pivotally connected, at 7, to the vessel 1 and the other end of which lever is extended into an elbow pipe 24 projecting outward from the vessel 1. Connected to the upwardly projecting end of the elbow pipe 24 is a resilient tubular bellows 8 which is adapted to expand and contract longitudinally in response to pressure variations within the autoclave. The lever 6 is bent at right angles similarly as the pipe 24 and is connected at its upper end to a disc 25 which closes the upper end of the bellows 8.

Depending from the extreme end of the lever or handle 3 carrying the cover 2 is a rod 9. Between the bottom end of this rod 9 and the disc 25 there is arranged a coil spring 10.

The pipe 15 extending downwardly from the bottom wall of the autoclave proper places the latter in communication with a separate chamber 11 arranged to be heated by any suitable means such as, as shown, an electric heating element 22 controlled by a thermostat 23. Projecting upwardly from the chamber 11 are one or more further pipes 14 which are passed through the bottom wall of the autoclave proper 1 and terminate in the interior thereof at a level some distance above that of the upper end of the pipe 15.

By 17 is designated a water-cooling coil having an inlet 18 and an outlet 19. The autoclave further has a pressure relief value 20 and an air exhaust valve 21. The latter valve 21 is to be kept open for some time during the initial pressure rise within the autoclave in order to permit dissipation of air present within the autoclave.

When the autoclave is to be taken into use, the cover 2 is removed and the autoclave is filled with water up to a level somewhat above the upper end of the pipe 15 but below the upper end of the pipe 14. The valve 5 is now in its closed position in which the same is normally maintained by the bellows 8.

The instruments or the like to be sterilized are then introduced into the autoclave in any suitable manner, and the cover 2 is secured in place by means of the clamp 4. This causes the rod 9 through the intermediary of the spring 10 to actuate the disc 25 connected to the lever 6 whereby the lever 6 is swung in a clockwise direction, as seen in Fig. 1, causing contraction of the bellows 8 longitudinally. This will effect opening of the valve 5 causing water to be supplied to the interior 12 of the chamber 11 in which the water is immediately vaporized by its contact with the heated bottom surface 13. The steam thus formed will rise through the pipe 14 and fill the autoclave proper 1.

As soon as the steam pressure within the autoclave 1 reaches a predetermined value, the valve 5 closes automatically due to the fact that the steam pressure effects an extension of the bellows 8 thereby pivoting the lever 6 counter-clockwise. Water will then be prevented from entering the chamber 11 and the steam generation will cease. As soon as, due to external conditions such as radiation etc., the pressure in the interior of the autoclave has decreased to a predetermined value, the spring 10 will be effective to open the valve 5 causing a fresh charge of water to be supplied into the chamber 11 and steam to be generated anew, whereby the pressure within the autoclave 1 will again be raised to the predetermined higher value.

Upon elapse of the period required for the sterilization to take place, the valve 5 is closed definitely. The autoclave is left to cool, if desired while circulating cooling water through the cooling coil 17. After the pressure has been reduced sufficiently, the cover 2 can be removed and the sterilized instruments withdrawn from the autoclave.

Fig. 1 also illustrates an arrangement which serves forcibly and positively to retain the valve 5 in its closed position. This arrangement comprises a screw 16 which cooperates with an arm 26 projecting from the disc 25 to form an abutment stop for this arm and thus prevents angular displacement of the lever 6 in a sense which would cause opening of the valve 5.

Figure 2:
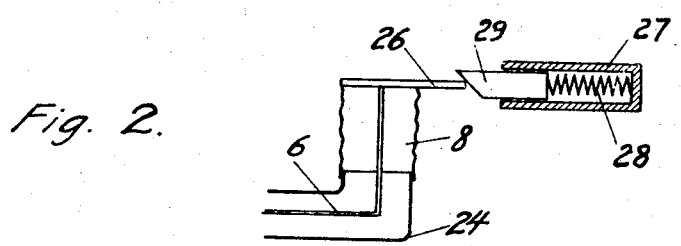
Figs. 2 and 3 illustrate certain modifications of elements associated with the autoclave.

Another automatically effective stop device is illustrated in Fig. 2. In this instance the arm 26 projecting from the disc 25 cooperates with the beveled extreme end of a plunger 29 retractable into the bore of a tubular body 27 against the opposing force of a spring 28. As the pressure within the autoclave 1 reaches a certain predetermined value the arm 26 will have moved sufficiently upward to allow the plunger 29 to snap in beneath the arm thus preventing the lever 6 from clockwise rotation to open the valve 5 in response to a pressure decrease within the autoclave.

Figure 3:
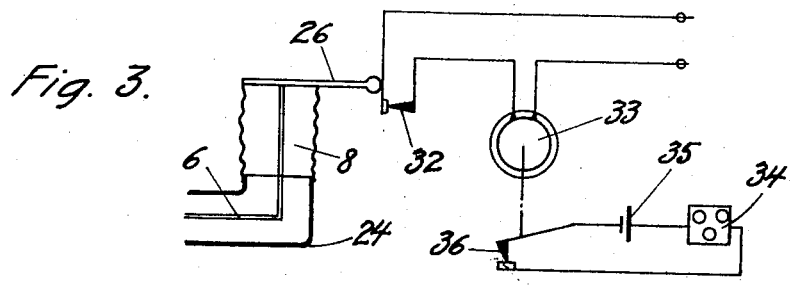

In accordance with Fig. 3, finally, the arm 26 projecting from the disc 25 is operative, after a certain elongation of the bellows 8 having taken place, to actuate an electric contact 32 which closes the operating circuit of a synchronous timer 33. The timer 33 in its turn, at the end of a predetermined period of time, actuates a contact 36 thereby closing the circuit from a source of current 35 through an indicator lamp or acoustic alarm 34, giving an indication that the sterilization is completed.

Various modifications are, of course, conceivable without departing from the scope of the appended claims.

What I claim is:

1. An autoclave for sterilizing purposes, comprising a pressure vessel, including a bottom wall and a removable cover, a separate vapor-generating chamber of large heat capacity provided with heating means disposed at a lower level than said pressure vessel, a first pipe extending between the bottom of the pressure vessel and the vapor-generating chamber and having its upper portion shaped to form a valve seat, a second pipe extending between the bottom of the pressure vessel and the vapor-generating chamber and terminating at a higher level in the pressure vessel than the first pipe, a valve member within the pressure vessel and cooperating with the valve seat of said first pipe, a resilient bellows outside the pressure vessel connected to and communicating with said pressure vessel, a lever connection between said resilient bellows and said valve member, said bellows tending to keep the valve member in the closed position so as to permit a quantity of liquid to be introduced into and remain in the pressure vessel until the autoclave is to be used, and means comprising a rod connected to said removable cover and a resilient member adapted to exert a valve-opening force on said bellows when the cover is applied to the pressure vessel to cause liquid to flow from said pressure vessel through the first pipe into said vapor-generating chamber in which it is instantly vaporized, the vapor thus generated flowing back into the pressure vessel through the second pipe and creating therein and in said bellows a pressure counteracting the valve-opening force applied to the latter so as to automatically control the movement of said valve member and keep the vapor pressure within the pressure vessel at a substantially constant value.

2. An autoclave as set forth in claim 1, including means extending from the bellows and engaging a manually operable stop member for keeping said bellows in a state of elongation corresponding to the valve member being closed.

3. An autoclave as set forth in claim 1, including an arm extending from the bellows and a spring actuated plunger operating with said arm for locking the bellows in a state of elongation corresponding to the valve member being closed.

4. An autoclave as claimed in claim 1, further comprising an alarm device, and a synchronous timer for actuating said alarm device after a predetermined period of time, said synchronous timer being adapted to be started by said bellows at a predetermined elongation thereof due to the pressure within the pressure vessel.

References Cited in the file of this patent

UNITED STATES PATENTS

| | | |
|---|---|---|
| 1,960,890 | Bidwell | May 29, 1934 |
| 2,673,379 | Jewell | Mar. 30, 1954 |